Sept. 9, 1958   P. SCHAEREN   2,851,642
ELECTROLYTE FOR ELECTROLYTIC CAPACITORS
Filed June 7, 1955
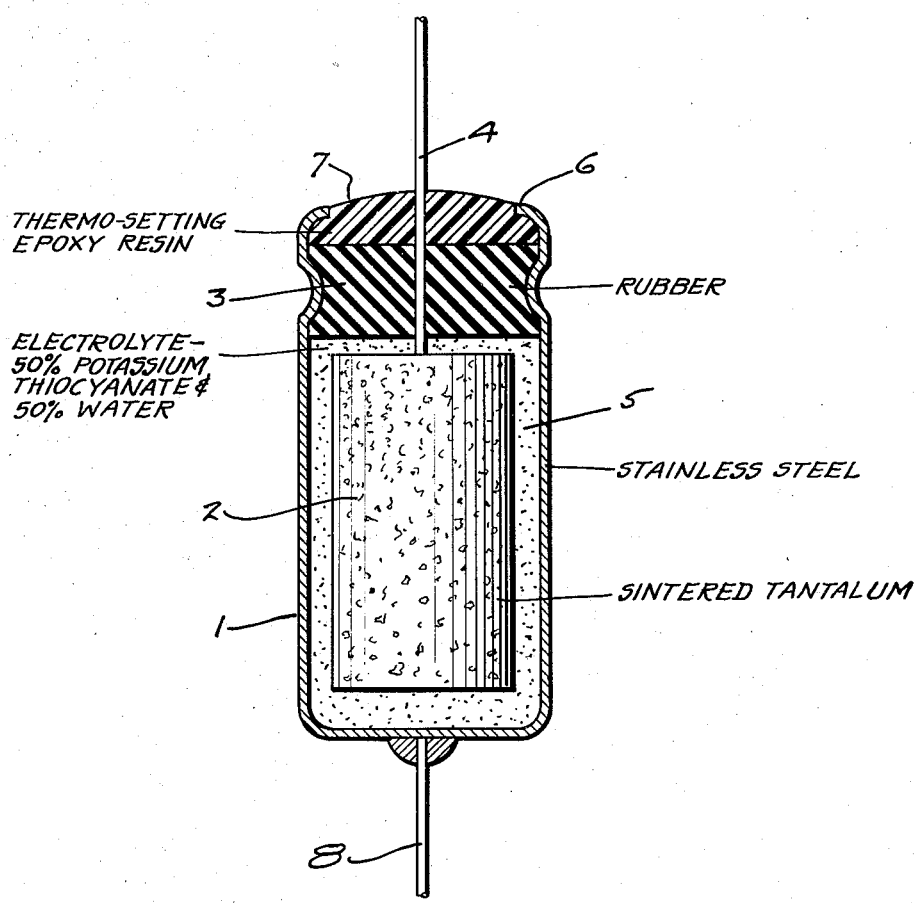
INVENTOR
P. SCHAEREN
BY
Robert Harding
ATTORNEY

United States Patent Office 2,851,642
Patented Sept. 9, 1958

2,851,642

ELECTROLYTE FOR ELECTROLYTIC CAPACITORS

Paul Schaeren, Yverdon, Switzerland, assignor to International Standard Electric Corporation, New York, N. Y., a corporation of Delaware Application June 7, 1955, Serial No. 513,889

Claims priority, application Switzerland July 2, 1954

1 Claim. (Cl. 317—230)

It is known to use electrolytes of good conductivity in electrolytic capacitors having electrodes of tantalum or another non-corrosive metal forming a dielectrically effective coating. Such electrolytes offer the advantage of small series resistance between the electrodes and consequently good power factors. This is particularly of importance when electrodes, made for instance of sintered tantalum, are used, for which, due to the narrow and deep pores of the spongy material, the series resistance between the inner portions of the sintered body and the counter-electrode might be higher than for a capacitor made according to a conventional method of foils with a porous spacing material therebetween.

Electrolytes of high electric conductivity used for electrolytic tantalum capacitors are known and consist of solutions of sulphuric or phosphoric acid. They have, besides the aforementioned advantage of small power factors, for suitably chosen compositions relatively low freezing and high boiling points so that such capacitors will safely operate within a wide range of temperatures. Owing to the high chemical stability of the anodically produced oxide film on the electrode, relatively satisfactory leakage currents may be obtained with the said strong electrolytes. Electrolytes containing sulphuric or phosphoric acid have however like all solutions containing strong acids, the disadvantage of rapidly deteriorating most of the materials with which they might contact when, for instance, leaking out from the capacitor casing occurs.

It is the object of the present invention to provide a new electrolyte for electrolytic capacitors which is particularly but not exclusively suitable for tantalum capacitors of the sintered body or roller type and which does not only possess the desired properties of the aforementioned electrolytes containing sulphuric or phosphoric acid without having any of their disadvantages but also such properties, not present in the latter, which make its use particularly desirable.

The invention is illustrated in the single figure which is a longitudinal, cross-sectional view of a condenser of the miniature type.

The condenser comprises, as illustrated, a casing 1, preferably made of stainless steel, enclosing a body 2 of sintered tantalum powder. A plug 3 of resilient insulating material, such as rubber, is inserted in the open end of the casing which is thereupon squeezed to hold the plug tightly in the casing. A lead wire 4 extends through a hole in the plug and forms the connection to the tantalum body 2. The space between the tantalum body 2 and the casing 1 is filled with the electrolyte 5. After the tantalum body and the electrolyte are placed in position and the plug 3 is squeezed in place to seal the opening, the free edge 6 of the casing is turned inwardly, as shown, and the space within the turned-over edge of the casing above the plug 3 is filled with a thermosetting resin in order to seal the end. Another lead 8 may be soldered to the outside of the casing to form the other terminal of the condenser.

The electrolyte of the present invention is characterized in this that it contains at least a thiocyanate and/or selenocyanate.

It has been found that by using such an electrolyte in place of the electrolytes used hitherto in electrolytic capacitors, leakage currents are obtained, the values of which are substantially lower than those obtained with the electrolytes used before. It is known that a reduction of the leakage current results in a longer life of the capacitor and can thus be considered as one of the most important criteria for its quality.

Besides this important advantage of an electrolyte comprising at least a thiocyanate and/or selenocyanate as compared with an electrolyte comprising sulphuric or phosphoric acid the new electrolyte offers moreover the great advantage of reacting almost neutrally, that is to say, it reacts considerably less with the materials with which it might contact when leaking out from the capacitor casing. It also seems that the new electrolyte is less "creeping" and thus allows the use of capacitor seals of very simple design without increasing the danger of leakage. It has furthermore been found that with regard to electric conductivity, the freezing point and the boiling point, the new electrolyte possesses similarly good properties as electrolyes containing sulphuric or phosphoric acid.

The new electrolyte may consist, for instance, of 50% water and 50% potassium thiocyanate (KSCN) but other compositions might also be suitable. For example sodium or calcium thiocyanates instead of potassium thiocyanate could be dissolved in water to obtain freezing points even lower than those for potassium thiocyanate whilst preserving the favourable electrical properties of the capacitor obtained with thiocyanates and/or selenocyanate.

The reason for the said advantageous effect of an electrolyte containing a thiocyanate and/or selenocyanate on the leakage current of a tantalum capacitor has not yet been found with certainty, but it is believed that the use of such an electrolyte removes impurities of the anode metal as complex thiocyanates or selenocyanates respectively, thus providing a clean surface and thereby improving the anodically formed metal oxide layer.

It is also possible to prepare electrolytes containing thiocyanate in which aqueous solutions of organic solvents, for example ethylene glycol are used instead of water. Whilst such electrolytes can also be used for tantalum sintered body capacitors, they are particularly suitable for tantalum foil capacitors.

The thiocyanates contained in the electrolyte are usually thiocyanates of alkali or alkaline earth metals, but thiocyanates of other metals could also be used. It is however preferable to use cations which are not nobler than tantalum itself.

In the formula "MeSCN" wherein "Me" is known to be a monovalent cation, sulphur can also be replaced by the element next in order in the same vertical group of the periodic system, i. e. selenium.

The following values have been measured for foil-type capacitors of equal voltage and capacity:

In a 33-percent aqueous sulphuric acid a leakage current of 13$\mu$A. was measured after 10 minutes electrification and at a temperature of 90° C., whereas under equal conditions, the leakage current was only 3.1 $\mu$A. for a 50-percent potassium thiocyanate solution. At 20° C. the leakage currents for the same tantalum foil were in the first case 1.4 $\mu$A. and in the latter 0.15 $\mu$A.

While the principles of the invention have been described above in connection with some particular electrolytes, it is to be clearly understood that this description

I claim:

An electrolytic capacitor comprising electrodes of sintered tantalum and an electrolyte comprising a solution of 50% water and 50% potassium thiocyanate.

References Cited in the file of this patent

Seidell: "Solubilities of Inorganic and Organic Compounds," v. 1, pp. 566–7 (1919), v. 2, p. 1378. (1928).